United States Patent
Coleman et al.

(10) Patent No.: US 10,333,157 B2
(45) Date of Patent: Jun. 25, 2019

(54) MEMBRANE-SEAL ASSEMBLY

(71) Applicant: Johnson Matthey Fuel Cells Limited, London (GB)

(72) Inventors: Robert Jeffrey Coleman, Wiltshire (GB); Julie O'Sullivan, Oxfordshire (GB); Angus Dickinson, Wiltshire (GB)

(73) Assignee: Johnson Matthey Fuel Cells Limited, London (GB)

( * ) Notice: Subject to any disclaimer, the term of this patent is extended or adjusted under 35 U.S.C. 154(b) by 198 days.

(21) Appl. No.: 15/529,679

(22) PCT Filed: Nov. 23, 2015

(86) PCT No.: PCT/GB2015/053562
§ 371 (c)(1),
(2) Date: May 25, 2017

(87) PCT Pub. No.: WO2016/083785
PCT Pub. Date: Jun. 2, 2016

(65) Prior Publication Data
US 2017/0331122 A1    Nov. 16, 2017

(30) Foreign Application Priority Data
Nov. 25, 2014   (GB) .................................. 1420934.0

(51) Int. Cl.
*H01M 8/0271*   (2016.01)
*H01M 8/1004*   (2016.01)
(Continued)

(52) U.S. Cl.
CPC ....... *H01M 8/0271* (2013.01); *H01M 8/1004* (2013.01); *H01M 8/1062* (2013.01);
(Continued)

(58) Field of Classification Search
CPC .......................... H01M 8/1062; H01M 8/1058
See application file for complete search history.

(56) References Cited

U.S. PATENT DOCUMENTS 5,264,299 A * 11/1993 Krasij ................. H01M 8/0271
429/492
5,976,726 A    11/1999 Wilkinson et al.
(Continued)

FOREIGN PATENT DOCUMENTS

DE    102011106767 B3    1/2012
EP    0731520 A1    9/1996
(Continued)

*Primary Examiner* — Maria Laios
(74) *Attorney, Agent, or Firm* — BakerHostetler

(57) ABSTRACT

The invention includes a reinforced membrane-seal assembly that comprises a reinforcing component, ion-conducting material, and seal material. The reinforcing component comprises a central region comprising a plurality of apertures extending from a first surface to a second surface of the reinforcing component, the central region having a first aperture area density; an inner peripheral border region surrounding the central region, where the inner peripheral border region is devoid of apertures; and an outer peripheral border region comprising a plurality of apertures extending from the first surface to the second surface of the reinforcing component, the outer peripheral border region having a second aperture area density. The outer peripheral border region surrounds the inner peripheral border region. The ion-conducting material at least partially fills each aperture in the central region of the reinforcing component and seal material fills each aperture in the outer peripheral border region of the reinforcing component.

24 Claims, 4 Drawing Sheets

(51) Int. Cl.
  *H01M 8/1018* (2016.01)
  *H01M 8/1062* (2016.01)
  *H01M 8/1065* (2016.01)
  *H01M 8/00* (2016.01)

(52) U.S. Cl.
  CPC ............ *H01M 8/1065* (2013.01); *H01M 8/00* (2013.01); *H01M 2008/1095* (2013.01)

(56) References Cited

U.S. PATENT DOCUMENTS

| | | | |
|---|---|---|---|
| RE37,307 E | | 8/2001 | Bahar et al. |
| 7,807,063 B2 | | 10/2010 | Liu et al. |
| 7,867,669 B2 | | 1/2011 | Liu et al. |
| 7,947,405 B2 | | 5/2011 | Mittelsteadt et al. |
| 2005/0249994 A1* | | 11/2005 | McLean ................. C25B 13/00 429/479 |
| 2006/0046121 A1 | | 3/2006 | Shimohira et al. |
| 2007/0264552 A1* | | 11/2007 | Hayamizu ............. H01M 4/926 429/442 |
| 2011/0104474 A1* | | 5/2011 | Liu .......................... C25B 13/02 428/322.7 |

FOREIGN PATENT DOCUMENTS

| | | |
|---|---|---|
| EP | 0631337 B2 | 7/2000 |
| EP | 1615282 A1 | 1/2006 |
| EP | 2858155 A1 | 4/2015 |
| WO | WO-00/24074 A1 | 4/2000 |
| WO | WO-2007-102469 A1 | 9/2007 |
| WO | WO-2009/040571 A1 | 4/2009 |
| WO | WO-2009/109780 A1 | 9/2009 |
| WO | WO-2009/153380 A1 | 12/2009 |
| WO | WO-2012/163383 A1 | 12/2012 |
| WO | WO-2014/006817 | 1/2014 |

* cited by examiner

MEMBRANE-SEAL ASSEMBLY

FIELD OF THE INVENTION

The present invention relates to a reinforced membrane-seal assembly and its use in an electrochemical device, in particular its use in a proton exchange membrane fuel cell.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrolytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore the gas diffusion layer must be porous and electrically conducting.

Electrocatalysts for fuel oxidation and oxygen reduction are typically based on platinum or platinum alloyed with one or more other metals. The platinum or platinum alloy catalyst can be in the form of unsupported nanoparticles (such as metal blacks or other unsupported particulate metal powders) or can be deposited as even higher surface area particles onto a conductive carbon substrate or other conductive material (a supported catalyst).

Conventional ion-conducting membranes used in the PEMFC are generally formed from perfluorinated sulphonic acid (PFSA) ionomers and the membranes formed from these ionomers are sold under the trade names Nafion® (E.I. DuPont de Nemours and Co.), Aciplex® (Asahi Kasei), Aquivion® (Solvay Specialty Polymers) and Flemion® (Asahi Glass KK). The PFSA ion-conducting membrane may contain a reinforcement, such as a planar porous material (for example expanded polytetrafluoroethylene as described in U.S. RE37307), embedded within the thickness of the membrane, to provide for improved mechanical strength of the membrane, such as increased tear resistance and reduced dimensional change on hydration and dehydration, and thus increase durability of the MEA and lifetime of the fuel cell. Other approaches for forming reinforced membranes include those disclosed in U.S. Pat. Nos. 7,807,063 and 7,867,669 in which the reinforcement is a rigid polymer film, such as polyimide, into which a number of pores are formed and then subsequently filled with the PFSA ionomer.

Conventionally, the MEA can be constructed by a number of methods outlined hereinafter:

(i) The electrocatalyst layer may be applied to the gas diffusion layer to form a gas diffusion electrode. A gas diffusion electrode is placed on each side of an ion-conducting membrane and laminated together to form the five-layer MEA;

(ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.

(iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Conventionally, the MEA is constructed so that the central polymeric ion-conducting membrane extends to the edge of the MEA, with the gas diffusion layers and electrocatalyst layers being smaller in area than the membrane such that there is an area around the periphery of the MEA which comprises ion-conducting membrane only. The area where no electrocatalyst is present is a non-electrochemically active region. Separate film layers, typically formed from non-ion conducting polymers, are generally positioned around the edge region of the MEA on the exposed surfaces of the ion-conducting membrane where no electrocatalyst is present (but will also often overlap on to the edge of the electrocatalyst layer) to provide a seal to prevent escape of reactant and product gases, to reinforce and strengthen the edge of the MEA and provide a suitable surface for supporting subsequent components such as sub-gaskets or elastomeric gaskets. An adhesive layer may be present on one or both surfaces of the seal film layer. The layers or components in the MEA are typically bonded by a lamination process.

SUMMARY OF THE INVENTION

With these conventional MEA constructions involving the use and bonding together of separate sealing films and ion-conducting membranes or catalyst coated ion-conducting membranes there remain considerable durability issues for the MEA due, for example, to the mechanical stresses that can be built up in the membrane and at the edges of the MEA where the seal overlaps the membrane, due to the dimensional changes that still occur within the conventional reinforced membranes on hydration and dehydration as the operational conditions of the fuel cell changes. These stresses cause a weakness in the membrane at these points that leads to tearing of the membrane in the edge regions close to the interface with the seal layer and subsequent membrane, MEA and fuel cell failure.

Therefore, even with state-of-the-art reinforced membranes, there is still the need to improve the durability and lifetime of the MEA when used in a fuel cell.

The invention provides a reinforced membrane-seal assembly comprising:

(i) a reinforcing component, wherein the reinforcing component is planar and comprises a first surface and a second surface, and wherein the reinforcing component comprises
  (a) a central region, the central region comprising a plurality of apertures extending from the first surface to the second surface of the reinforcing component, the central region having a first aperture area density;

(b) an inner peripheral border region, wherein the inner peripheral border region surrounds the central region, and wherein the inner peripheral border region is devoid of apertures; and (c) an outer peripheral border region comprising a plurality of apertures extending from the first surface of the reinforcing component to the second surface of the reinforcing component, the outer peripheral border region having a second aperture area density, wherein the outer peripheral border region surrounds the inner peripheral border region;

(ii) ion-conducting material; and (iii) seal material;

wherein, ion-conducting material at least partially fills each aperture in the central region of the reinforcing component and wherein seal material fills each aperture in the outer peripheral border region of the reinforcing component.

DETAILED DESCRIPTION OF THE INVENTION

Figure 1A:
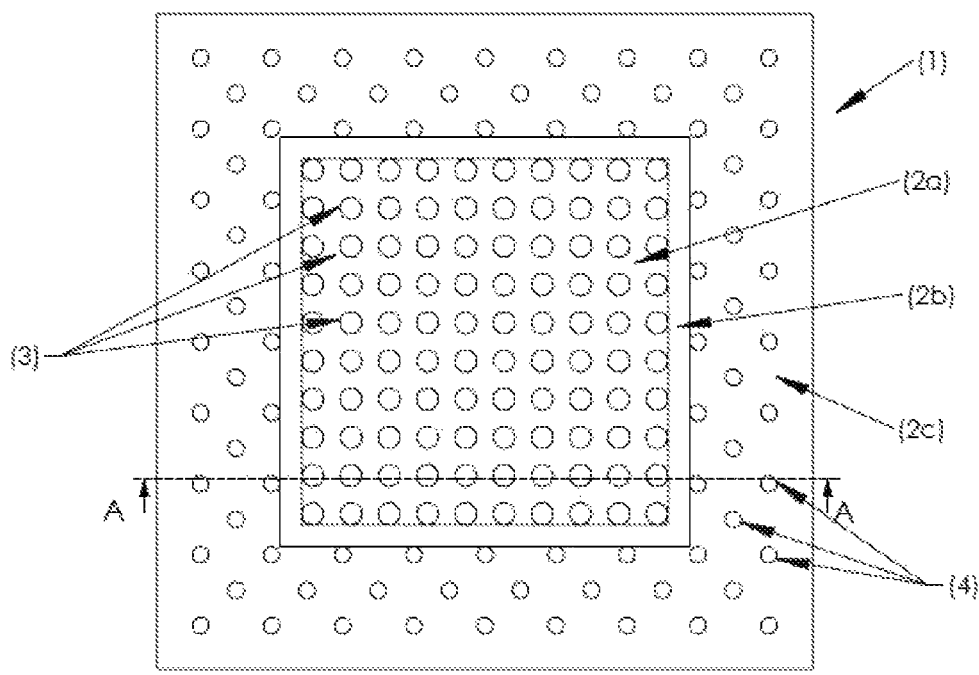
FIGS. 1a, 1b and 1c are a plan view, a side elevation view and a 3-d representation respectively of a reinforcing component used in the invention.

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

The invention provides a reinforced membrane-seal assembly comprising a reinforcing component, an ion-conducting material and a seal component.

The reinforcing component is planar and comprises a first surface and an opposing second surface.

The reinforcing component suitably has a thickness of from 5-100 µm, suitably 5-50 µm, and preferably 5-20 µm.

The planar dimensions (x/y dimensions) of the reinforcing component will be dependent upon the final use of the reinforced membrane-seal assembly and determinations thereof are within the capability of the skilled person. The x and y dimensions are not necessarily the same and the planar shape of the reinforcing component is not necessarily a square or rectangle; again, the shape will be determined by the final use.

The reinforcing component is made of a film material. The film material may be any material suitable for use in the membrane-seal assembly of the invention; the film material is impermeable to gases and liquids, mechanically strong and chemically stable to degradation in the fuel cell environment (i.e. stable under a combination of acidic conditions and elevated temperatures and pressures).

The film material may be, for example, a polymeric material such a polyetheretherketone (PEEK), polyvinylidene difluoride (PVDF), polyimide (PI), polyetherimide, polyethersulphone (PES), polypropylene (PP), polyetherimide (PEI), fluorinated ethylene propylene (FEP), ethylene tetrafluoroethylene (ETFE), polytetrafluoroethylene (PTFE), Viton®, polyethylene oxide (PEO), polyphenylene ether (PPE), polyethylene terephthalate (PET), polyacrylonitrile (PAN), poly(p-phenylene sulphide) (PPS), polyethylene naphthalate (PEN).

Alternatively, the film material may be a non-corrodible metal or a metal film, such as a stainless steel, coated with a protective layer of polymer or gold to provide the corrosion resistance.

The ion-conducting material is suitably a proton-conducting polymer or an anion-conducting polymer, such as a hydroxyl anion-conducting polymer. Examples of suitable proton-conducting polymers include perfluorosulphonic acid ionomers (e.g. Nafion® (E.I. DuPont de Nemours and Co.), Aciplex® (Asahi Kasei), Aquivion™ (Solvay Specialty Polymers SpA), Flemion® (Asahi Glass Co.), or ionomers based on a sulphonated hydrocarbon such as those available from FuMA-Tech GmbH as the Fumapem® P, E or K series of products, JSR Corporation, Toyobo Corporation, and others. Examples of suitable anion-conducting polymers include A901 made by Tokuyama Corporation and Fumasep FAA from FuMA-Tech GmbH.

The ion-conducting material may comprise one or more hydrogen peroxide decomposition catalysts. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting material may optionally comprise a recombination catalyst, in particular a catalyst for the recombination of unreacted hydrogen and oxygen, that can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

The seal material is suitably a polymeric material and is selected from the group fluorosilicones, polyurethanes, co-polyamides, epoxies and fluoroacrylates. Specific examples of suitable seal materials include: polyvinylidenefluoride (PVDF), polyetherimide (PEI), polyimide (PI), polyethersulphone (PES), fluorinated ethylene propylene (FEP), ethylene tetrafluoroethylene (ETFE), Viton®, polyethylene oxide (PEO), polyphenylene ether (PPE), polyethylene terephthalate (PET), polyethylene naphthalate (PEN), polyacrylonitrile (PAN), poly(p-phenylene sulphide) (PPS), polyolefins and silicones.

The invention will be described in more detail with reference to the Figures.

Figure 1B:
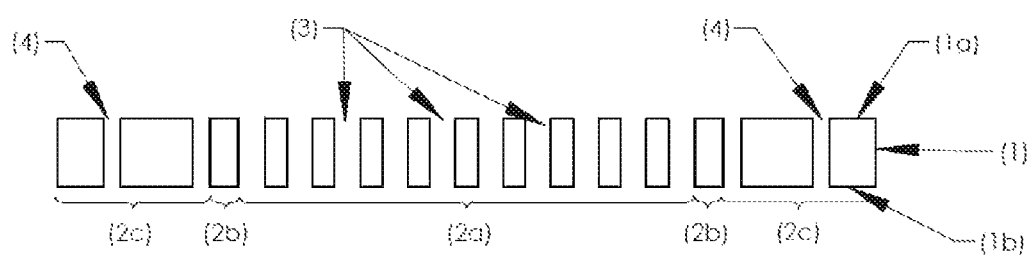
Figure 1C:
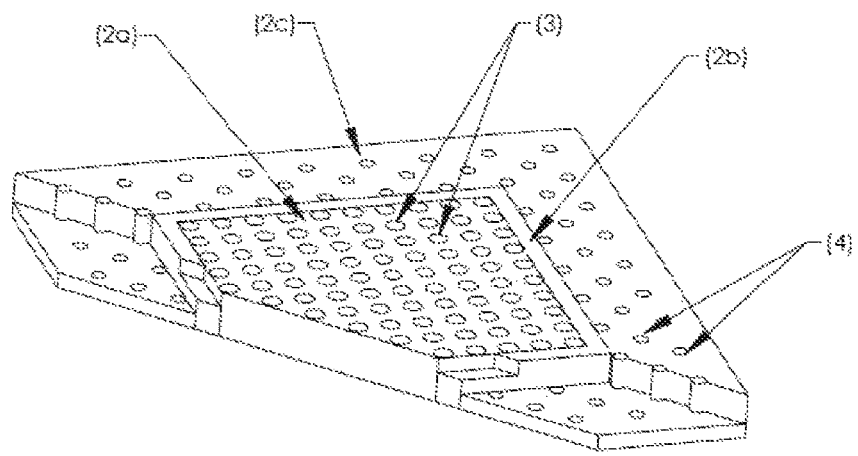

FIG. 1a shows a plan view of a reinforcing component of a reinforced membrane-seal assembly of the invention, FIG. 1b a side elevation through A-A of the reinforcing component of FIG. 1a and FIG. 1c a 3-d representation of the reinforcing component. The reinforcing component (1) has a first surface (1a) and an opposing second surface (1b). The reinforcing component (1) has a central region (2a), an inner peripheral border region (2b) surrounding the central region (2a), and an outer peripheral border region (2c) surrounding the inner peripheral border region (2b).

The central region (2a) comprises a plurality of apertures (3) extending from the first surface (1a) of the reinforcing component (1) to the second surface (1b) of the reinforcing component (1), the central region (2a) having a first aperture area density. The first aperture area density is suitably from 70-95%, suitably 75-95% and preferably 80-95% of the planar area of the central region (2a).

The apertures (3) in the central region (2a) may be of any shape and size and within the central region (2a) there may be a plurality of shapes and sizes. The cross-sectional area of each aperture (3) is suitably from 1 µm² to 1 mm².

The apertures (3) in the central region (2a) collectively may be of any pattern in the reinforcing component surface. For circular apertures, the apertures may be designed to form a cubic close packed structure, or may be of a hexagonal close packed structure, in which the distance from any location on the remaining solid part of the reinforcing component surface to an edge of an aperture is minimised.

The apertures (3) in the central region (2a) may be formed by any suitable method including, but not limited to, laser drilling, lithography, micro moulding or mechanical punching.

The first aperture area density is the total surface area of the reinforcing component (1) in the central region (2a) which is covered by apertures (3), defined as a percentage of the total planar area of the central region (2a). The first aperture area density is calculated using the following basic equation:

$$\frac{\text{Total aperture area of reinforcing component in central region}}{\text{Total planar area of reinforcing component in central region}} \times 100\%$$

The inner peripheral border region (2b) is suitably of a narrower width than the outer peripheral border region (2c) and may be considerably narrower than the outer peripheral border region (2c).

The inner peripheral border region (2b) is likely to have a width of 10 mm or less and preferably a width of greater than 1 mm.

The inner peripheral border region is devoid of apertures.

The outer peripheral border region (2c) has a width that will be dependent on the final use of the reinforced membrane-seal assembly and the fuel cell stack design in which it is used. Such a determination is within the capability of the skilled person. The outer peripheral border region (2c) is likely to have a minimum width of 0.5 cm and a maximum width of 20 cm.

The outer peripheral border region (2c) comprises a plurality of apertures (4) extending from the first surface (1a) of the reinforcing component (1) to the second surface (1b) of the reinforcing component (1), the outer peripheral border region (2c) having a second aperture area density.

The second aperture area density is suitably up to 70%, suitably up to 50% and preferably up to 35% of the planar area of the outer peripheral border region (2c). The second aperture area density is suitably at least 5%, suitably at least 10% of the planar area of the outer peripheral border region (2c).

The apertures (4) in the outer peripheral border region (2c) may be of any shape and size and within the outer peripheral border region (2c) there may be a plurality of shapes and sizes. The cross-sectional area of each aperture (4) is suitably from 1 µm² to 1 mm².

The apertures in the outer peripheral border region may be formed by any suitable method including, but not limited to, laser drilling, lithography, micro moulding or mechanical punching.

The second aperture area density is the total surface area of the reinforcing component (1) in the outer peripheral border region (2c) which is covered by apertures, defined as a percentage of the total planar area of the outer peripheral border region (2c). The second aperture area density is calculated using the following basic equation:

$$\frac{\text{Total aperture area of reinforcing component in outer peripheral border region}}{\text{Total planar area of reinforcing component in outer peripheral border region}} \times 100\%$$

Porting or manifolding holes that permit fuel cell reactant inlet and product outlet may also be present in the outer peripheral border region; however, these are not considered to be apertures and are not taken into account when calculating the second aperture area density.

In a preferred embodiment, the second aperture area density is less than the first aperture area density.

Figure 2:
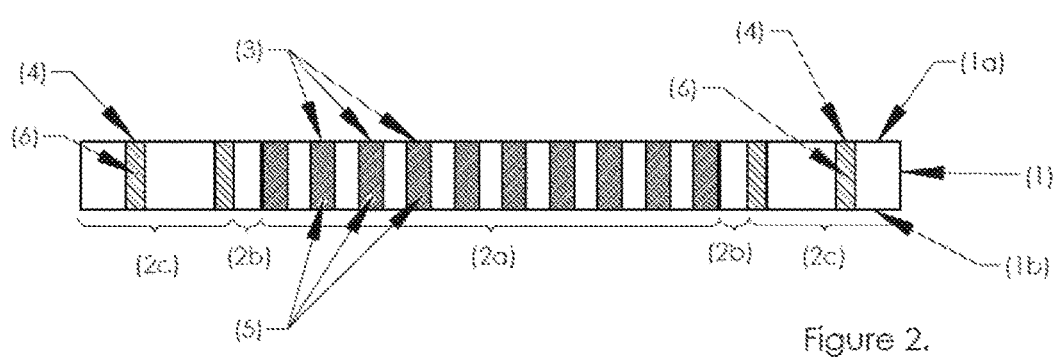
FIGS. 2, 3, 4 and 5 are side elevation views of a reinforced membrane-seal assembly of the invention.

FIG. 2 shows a side elevation view of a reinforced membrane-seal assembly of the invention, wherein each aperture (3) in the central region (2a) of the reinforcing component (1) is essentially completely filled with ion-conducting material (5) and each aperture (4) in the outer peripheral border region (2c) of the reinforcing component (1) is essentially completely filled with seal material (6). By 'essentially completely filled' is meant that the aperture is 90% filled, more suitably 95% filled, preferably 99% filled and most preferably 100% filled.

The ion-conducting material (5) may be applied into the apertures (3) in the central region (2a) of the reinforcing component (1) by discrete printing methods such as slot die, screen printing, gravure, pad printing and various jetting techniques (inkjet, dispense jet). Alternatively, the apertures can be impregnated with ion-conducting material by applying the reinforcement onto a wet layer of an ion-conducting solution.

Seal material (6) may be applied into the apertures (4) in the outer peripheral border region (2c) of the reinforcing component (1) by discrete printing methods such as slot die, screen printing, gravure, pad printing and various jetting techniques (inkjet, dispense jet). Alternatively, the apertures (4) can be impregnated with seal material (6) by applying the reinforcing component (1) onto a wet layer of seal material (6). Alternatively, the apertures (4) can be impregnated with seal material (6) by applying a melt-processable material to either or both surfaces (1a) and (1b) and applying temperature and/or pressure to melt the seal material to fill apertures (4).

Alternatively, the apertures (3) are not essentially completely filled with ion-conducting material (5). FIG. 3 shows the central region (2a) of the reinforcing component (1) of FIG. 1 wherein each aperture (3) in the central region (2a) of the reinforcing component (1) is at least partially filled with ion-conducting material (5). In each partially filled aperture (3), the ion-conducting material (5) may be flush with one of the first (1a) and second (1b) surfaces of the reinforcing component (1) and in-board of the other (FIG. 3a shows the ion-conducting material (5) being flush with the second surface (1b) of the reinforcing component (1)); alternatively the ion-conducting material (5) in each partially filled aperture (3) is in-board of both the first (1a) and second (1b) surfaces of the reinforcing component (1) (FIG. 3b).

Figure 3A:
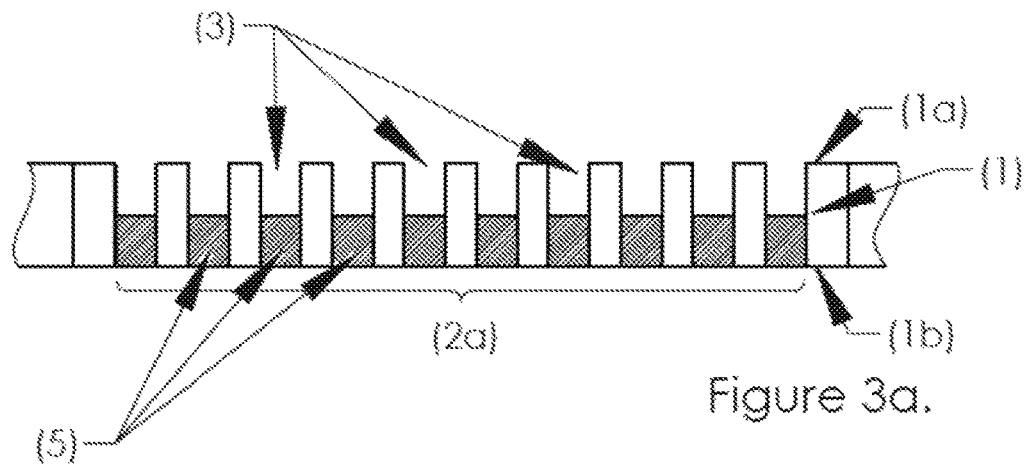
Figure 3B:
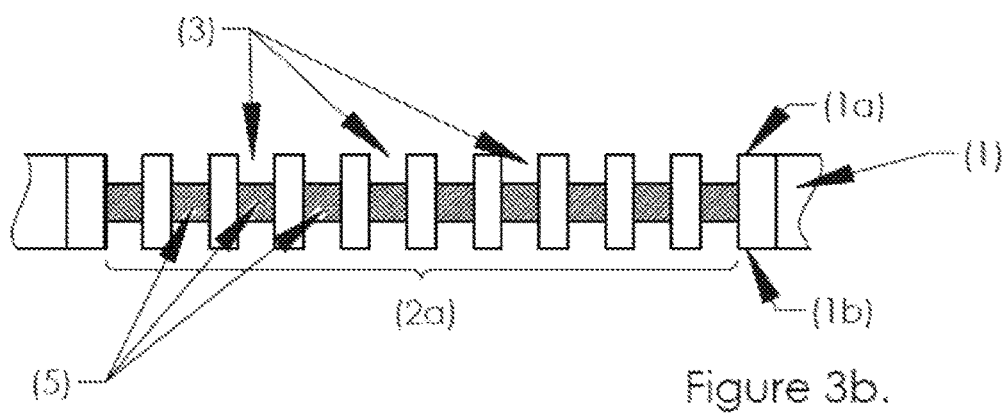
Figure 4A:
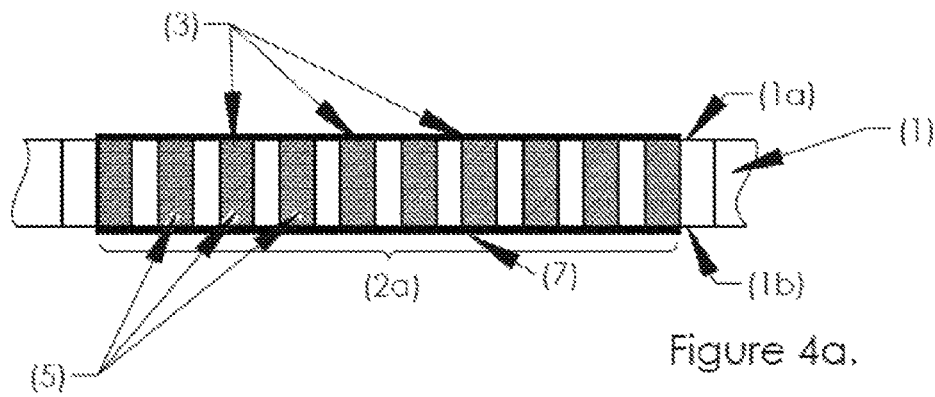
Figure 4B:
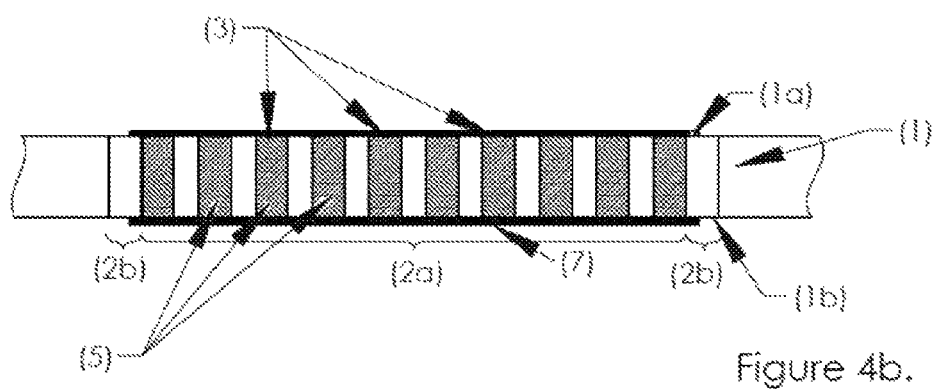

When each aperture (3) in the central region (2a) of the reinforcing component (1) is either partially filled with ion-conducting material (5) and wherein the ion-conducting material (5) is flush with one of the first (1a) and second (1b)

surfaces of the reinforcing component (1) (e.g. as shown in FIG. 3a), or when each aperture (3) in the central region (2a) of the reinforcing component (1) is essentially completely filled with ion-conducting material (5) (e.g. as shown in FIG. 2), additional ion-conducting material may be present as a layer (7) on one or both of the first (1a) and second (1b) surfaces of the reinforcing component (1) in the central region (2a), in which the ion-conducting material (5) is flush with the first (1a) and/or second (1b) surface of the reinforcing component. FIG. 4a shows a layer (7) of ion-conducting material (5) on both the first (1a) and second (1b) surfaces of the reinforcing component (1). The layer (7) of ion-conducting material (5) may extend partially (FIG. 4b) or completely (not shown) across the inner peripheral border region (2b). Layer (7) of ion-conducting material (5) is suitably 1 to 5 µm in thickness.

Layer (7) of ion-conducting material (5) may be applied to one or both first (1a) and second (1b) surfaces of the reinforcing component (1) in the central region (2a) by discrete printing methods such as slot die, screen printing, gravure, pad printing and various jetting techniques (inkjet, dispense jet). The lower layer of the ion conducting material could be applied at the same time as filling the apertures by coating the ion-conducting material down as a solution and laying the reinforcement into this solution or by using these printing methods to apply the ion-conducting material as a solution on to the upper surface of the reinforcement.

Figure 5:
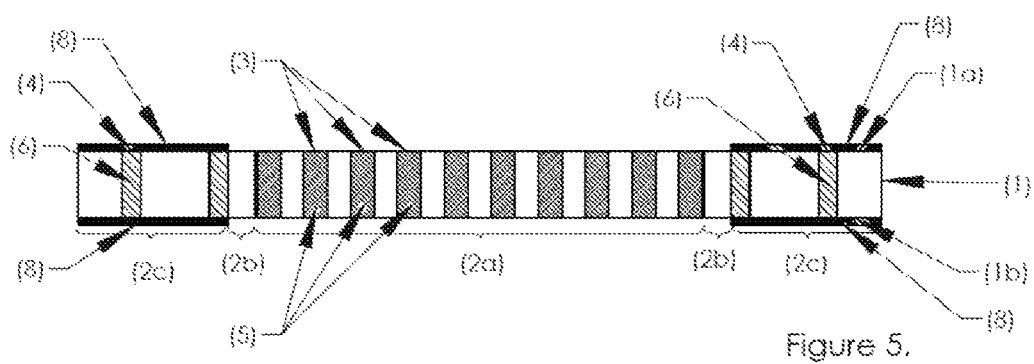

In addition to seal material (6) filling apertures (4) in the outer peripheral border region (2c) of reinforcing component (1), seal material (6) may also be present on one or both of the first (1a) and second (1b) surfaces of the reinforcing component (1) to form layer (8) (FIG. 5). The layer (8) may extend partially or completely across the inner peripheral border region (2b) (not shown). Layer (8) of seal material (6) is suitably 1 to 5 µm in thickness. Layer (8) may be applied at the same time as filling the apertures (4) by coating the material down as a solution and laying the reinforcing component into this solution or by using these printing methods to deposit seal material on to the upper surface of the reinforcing component.

Alternatively, a further seal component may be applied to one or both of the first (1a) and second (1b) surfaces of reinforcing component (1) to form layer (8). Examples of suitable materials which may be used for the further seal component may be the same as those used for the reinforcing component, or may be different, and include polymeric materials such as fluorosilicones, polyurethanes, co-polyamides, epoxies and fluoroacrylates. Specific examples of suitable seal materials include: polyvinylidenefluoride (PVDF), polyetherimide (PEI), polyimide (PI), polyethersulphone (PES), fluorinated ethylene propylene (FEP), ethylene tetrafluoroethylene (ETFE), Viton®, polyethylene oxide (PEO), polyphenylene ether (PPE), polyethylene terephthalate (PET), polyethylene naphthalate (PEN), polyacrylonitrile (PAN), poly(p-phenylene sulphide) (PPS), polyolefins and silicones.

The further seal component may be applied as a preformed film (either as strips or as a window-frame structure of appropriate dimensions cut from a sheet of the seal component film) and directly applied to one or both surfaces of the outer peripheral border region using pressure or heat, or a combination of both, to effect the application and bonding.

For the avoidance of doubt, no ion-conducting material (5) is present in the outer peripheral border region (2c) and no seal material (6) is present in the central region (2a) of the reinforcing component (1).

The inner peripheral border region is devoid of apertures. The lack of apertures in this region ensures there is no through-plane path, through which reactant gases can permeate.

Although the reinforced membrane-seal assembly of the invention has been described in terms of a discrete assembly, a continuous web (strip) of multiple reinforced membrane-seal assemblies could equally be provided and is within the scope of the invention. Such a web would be made by starting from a web of reinforcing component having a plurality of central regions, inner peripheral border regions and outer peripheral border regions arranged in a down-web direction and optionally also in a cross-web direction.

The invention also provides a catalysed reinforced membrane-seal assembly comprising a catalyst component and a reinforced membrane-seal assembly of the invention.

If each aperture in the central region of the reinforcing component of the reinforced membrane-seal assembly is partially filled with ion-conducting material, the catalyst component fills the remaining aperture such that the aperture is essentially completely filled. Thus, catalyst component may be present at only one of the first and second surfaces or at both the first and second surfaces of reinforcing component of the reinforced membrane-seal assembly. The catalyst component may further extend beyond the surface(s) of the reinforcing component such that a layer of catalyst component is present as a layer on one or both of the first and second surfaces of the reinforcing component in the central region. The layer of catalyst component may extend partially or completely across the inner peripheral border region.

If each aperture in the central region of the reinforcing component of the reinforced membrane-seal assembly is essentially completely filled with ion-conducting material, the catalyst component is present as a layer on one or both of the first and second surfaces of the reinforcing component in the central region. The layer of catalyst component may extend partially or completely across the inner peripheral border region.

The catalyst component comprises one of more electrocatalysts. The one or more electrocatalysts are independently a finely divided unsupported metal powder, or a supported catalyst wherein small catalyst nanoparticles are dispersed on an electrically conducting high surface area support, such as a particulate carbon black material. The electrocatalyst metal is suitably selected from
  (i) the platinum group metals (platinum, palladium, rhodium, ruthenium, iridium and osmium),
  (ii) gold or silver,
  (iii) a base metal,
or an alloy or mixture comprising one or more of these metals or their oxides. The preferred electrocatalyst metal is platinum, which may be alloyed with other precious metals or base metals. If the electrocatalyst is a supported catalyst, the loading of metal particles on the support material is suitably in the range 10-90 wt %, preferably 15-75 wt % of the weight of resulting electrocatalyst.

The exact electrocatalyst used will depend on the reaction it is intended to catalyse and its selection is within the capability of the skilled person.

The catalyst component is suitably applied into the apertures and/or onto the first and/or second face of the reinforcing component in the central region as an ink, either organic or aqueous (but preferably aqueous). The ink may suitably comprise other components, such as ion-conducting polymer as described in EP0731520, which are included to improve the ionic conductivity within the layer. Alternatively, if the catalyst component is present as a layer on the first and/or second face of the reinforcing component in the central region, the catalyst component can be applied by transfer of a previously prepared catalyst layer; for example a catalyst layer is applied onto a decal transfer substrate film (e.g. PTFE) and the catalyst layer then transferred to the reinforced membrane-seal assembly of the invention by techniques involving pressure and temperature that are well known to those in the art.

The catalyst component may further comprise additional components. Such additional components include, but are not limited to, a catalyst which facilitates oxygen evolution and therefore will be of benefit in cell reversal situations and to provide resistance to degradation caused by repeated start-up and shut-down operations, or a hydrogen peroxide decomposition catalyst. Examples of such catalysts and any other additives suitable for inclusion in the catalyst layer will be known to those skilled in the art.

The invention further provides a reinforced membrane-seal electrode assembly comprising a reinforced membrane-seal assembly of the invention and a gas diffusion electrode present on at least one face of the reinforced membrane-seal assembly.

The invention further provides a reinforced membrane-seal electrode assembly comprising a catalysed reinforced membrane-seal assembly and a gas diffusion layer present on at least one face of the reinforced membrane-seal assembly.

The reinforced membrane-seal electrode assembly may be made up in a number of ways including, but not limited to:
(i) a reinforced membrane-seal assembly of the invention may be sandwiched between two gas diffusion electrodes (one anode and one cathode);
(ii) a catalyst-coated reinforced membrane-seal assembly of the invention having a catalyst component on one side may be sandwiched between a gas diffusion layer and a gas diffusion electrode, the gas diffusion layer contacting the side of the catalyst-coated reinforced membrane-seal assembly having the catalyst component or;
(iii) a catalyst-coated reinforced membrane-seal assembly of the invention having a catalyst component on both sides may be sandwiched between two gas diffusion layers.

The anode and cathode gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from Ballard Power Systems Inc., or woven carbon cloths. The carbon paper, web or cloth may be provided with a further treatment prior to being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

The reinforced membrane-seal assembly, catalyst-coated reinforced membrane-seal assembly or reinforced membrane-seal electrode assembly may further comprise an additive. The additive may be present within the ion-conducting material (as described further hereinbefore) of the reinforced membrane-seal assembly, catalyst-coated reinforced membrane-seal assembly or reinforced membrane-seal electrode assembly or in the case of the catalyst-coated reinforced membrane-seal assembly or reinforced membrane-seal electrode assembly, may be present at one or more of the interfaces between the various layers and/or within one or more of the layers.

The additive may be one or more selected from the group consisting of hydrogen peroxide decomposition catalysts, radical scavengers, free radical decomposition catalyst, self-regenerating antioxidant, hydrogen donors (H-donor) primary antioxidant, free radical scavenger secondary antioxidant, oxygen absorbers (oxygen scavenger). Examples of these different additives may be found in WO2009/040571 and WO2009/109780. A preferred additive is cerium dioxide (ceria).

A further aspect of the invention provides a sub-gasketed reinforced membrane-seal assembly comprising a reinforced membrane-seal assembly and a sub-gasket applied on one or both faces to the reinforcing component in the outer peripheral border region. Also provided is a sub-gasketed catalysed reinforced membrane-seal assembly comprising a catalysed reinforced membrane-seal assembly of the invention and a sub-gasket applied on one or both faces to the reinforcing component in the outer peripheral border region. The sub-gasket is designed to provide additional strength and robustness to the edges of the catalysed reinforced membrane-seal assembly. The sub-gasket is typically a polymeric material and may be selected from the same materials as the seal materials or may be a different type of polymer specifically selected for its application as a sub-gasket. The sub-gasket may be applied as a coating from a solution or dispersion or applied as a bead from a viscous mixture onto the reinforcing component (or seal component if present) in the outer peripheral border region using coating processes known to those in the art, or may be applied as a pre-formed picture frame film over the outer peripheral border region.

An adhesive layer may be used to assist adhesion of the sub-gasket to the catalysed reinforced membrane-seal assembly. The adhesive layer may be an integral part of the sub-gasket, such that the sub-gasket and adhesive layer are applied in a single step, or the adhesive layer may first be applied to the outer peripheral border region of the catalysed reinforced membrane-seal assembly and the sub-gasket subsequently applied to the adhesive layer.

A further aspect of the invention provides a sub-gasketed reinforced membrane-seal electrode assembly comprising a sub-gasketed reinforced membrane-seal assembly and a gas diffusion electrode on one or both faces of the sub-gasketed reinforced membrane-seal assembly. Also provided is a sub-gasketed reinforced membrane-seal electrode assembly comprising a sub-gasketed catalysed reinforced membrane-seal assembly and a gas diffusion layer on one or both faces of the sub-gasketed catalysed reinforced membrane-seal assembly.

The invention further provides a fuel cell comprising a reinforced membrane-seal assembly, a catalysed reinforced membrane-seal assembly or a reinforced membrane-seal electrode assembly as hereinbefore described. In one embodiment, the fuel cell is a PEMFC.

Although the invention is described primarily with respect to a PEMFC, it will be appreciated that the membrane seal assembly could be used in other electrochemical systems, such as electrolysers.

The invention will be further described with reference to the following examples which are illustrative and not limiting of the invention.

A reinforced membrane seal assembly of the invention is fabricated as illustrated in FIG. 2. A 12 µm thick polyethylene naphthalate (PEN) film is perforated using a laser drilling system to create apertures defining the central region of the reinforcing component. The apertures cut into the PEN film are circular and in the size range of 250 to 300 µm. The apertures are arranged in a hexagonal close-packed pattern with a first area aperture density of 80%.

Additional apertures are formed using the laser drilling system to create apertures defining the outer peripheral border region of the reinforcing component. These apertures are also circular in the size range of 250 to 300 µm giving a second area aperture density of 10%.

A liquid dispersion of a PFSA ion-conducting ionomer is coated as a thin layer onto a release film and dried, such that after drying the resulting ionomer layer is 1 µm thick. The size of the area coated is such that the edge of the ionomer layer extends beyond the central region into the inner peripheral border region by 3 mm of the overall 6 mm width of the inner peripheral region of the reinforcing component. A second coating of the PFSA ionomer dispersion is then coated on top of the first layer and whilst the second layer is still wet the reinforcing component prepared above is placed on top of the second layer, the reinforcing component being held under tension. The reinforcing component is drawn down into the wet ionomer solution so that all of the apertures in the reinforcing component are completely filled with ionomer from the second coating once dried. After drying, a final coating of the PFSA ionomer dispersion is applied to the upper surface of the reinforcing component and dried to ensure that the central region of the reinforcing component is fully encapsulated by ionomer material, i.e. there is no part of the central region of the reinforcing component left uncovered by ionomer.

Once the ionomer has dried the reinforced membrane seal assembly is completed by one to two methods:

(i) window frames of a seal material are attached to the outer peripheral border region of the reinforcing component, whilst not over laying any of the ionomer material that extends into the inner peripheral border region. This is achieved by applying a window frame of a melt processable material (for example a trilayer film of ethylene-vinyl acetate/polyethylene terephthalate/ethylene-vinyl acetate) to each surface of the reinforcing component in the outer peripheral border region and laminating to the reinforcing component under temperature and pressure. This results in the pores of the reinforcing component in the outer peripheral border region being impregnated by the melt processable material and the window frame on each surface of the reinforcing component being directly bonded to each other through the apertures in the outer peripheral border region.

(ii) a liquid seal solution is deposited in a window frame shape, such that the open area in the centre is 1-2 mm larger than the ionomer area impregnated into the reinforcing component as described above. The ionomer-impregnated reinforcing component is lowered onto the liquid seal solution so that the seal solution covers the outer peripheral border region and impregnates the apertures of the outer peripheral border region. Once this layer is dry the process is repeated to ensure the apertures are fully impregnated and a layer of seal material is present on both surface of the outer peripheral border region of the reinforcing component.

The invention claimed is:

1. A reinforced membrane-seal assembly comprising:
(i) a reinforcing component, wherein the reinforcing component is planar and comprises a first surface and a second surface, and wherein the reinforcing component comprises
(a) a central region, the central region comprising a plurality of apertures extending from the first surface to the second surface of the reinforcing component, the central region having a first aperture area density;
(b) an inner peripheral border region, wherein the inner peripheral border region surrounds the central region, and wherein the inner peripheral border region is devoid of apertures; and
(c) an outer peripheral border region comprising a plurality of apertures extending from the first surface of the reinforcing component to the second surface of the reinforcing component, the outer peripheral border region having a second aperture area density, wherein the outer peripheral border region surrounds the inner peripheral border region;
(ii) ion-conducting material; and
(iii) seal material;
wherein, ion-conducting material at least partially fills each aperture in the central region of the reinforcing component and wherein seal material fills each aperture in the outer peripheral border region of the reinforcing component.

2. A reinforced membrane-seal assembly according to claim 1, wherein the second aperture area density is less than the first aperture area density.

3. A reinforced membrane-seal assembly according to claim 2, wherein the ion-conducting material is flush with at least one of the first and second surfaces of the reinforcing component.

4. A reinforced membrane-seal assembly according to claim 3, wherein a layer of ion-conducting material is present on one or both of the first and second surfaces of the reinforcing component in the central region in which the ion-conducting material is flush with the first and/or second surface of the reinforcing component.

5. A reinforced membrane-seal assembly according to claim 4, wherein the layer of ion-conducting material extends partially or completely across the inner peripheral border region.

6. A reinforced membrane-seal assembly according to claim 2, wherein the ion-conducting material essentially fills each aperture in the central region of the reinforcing component.

7. A reinforced membrane-seal assembly according to claim 6, wherein a layer of ion-conducting material is present on one or both of the first and second surfaces of the reinforcing component in the central region in which the ion-conducting material is flush with the first and/or second surface of the reinforcing component.

8. A reinforced membrane-seal assembly according to claim 7, wherein the layer of ion-conducting material extends partially or completely across the inner peripheral border region.

9. A reinforced membrane-seal assembly according to claim 2, wherein a seal component is present on one or both of the first and second surfaces of the reinforcing component in the outer peripheral border region.

10. A catalysed reinforced membrane seal assembly comprising a catalyst component and a reinforced membrane seal assembly according to claim 2.

11. A reinforced membrane seal electrode assembly comprising a reinforced membrane seal assembly according to claim 2.

12. A fuel cell comprising a reinforced membrane seal assembly according to claim 2.

13. A fuel cell according to claim 12, wherein the fuel cell is a proton exchange membrane fuel cell.

14. A reinforced membrane-seal assembly according to claim 1, wherein the ion-conducting material is flush with at least one of the first and second surfaces of the reinforcing component.

15. A reinforced membrane-seal assembly according to claim 14, wherein a layer of ion-conducting material is present on one or both of the first and second surfaces of the reinforcing component in the central region in which the ion-conducting material is flush with the first and/or second surface of the reinforcing component.

16. A reinforced membrane-seal assembly according to claim 15, wherein the layer of ion-conducting material extends partially or completely across the inner peripheral border region.

17. A reinforced membrane-seal assembly according to claim 1, wherein the ion-conducting material essentially fills each aperture in the central region of the reinforcing component.

18. A reinforced membrane-seal assembly according to claim 17, wherein a layer of ion-conducting material is present on one or both of the first and second surfaces of the reinforcing component in the central region in which the ion-conducting material is flush with the first and/or second surface of the reinforcing component.

19. A reinforced membrane-seal assembly according to claim 18, wherein the layer of ion-conducting material extends partially or completely across the inner peripheral border region.

20. A reinforced membrane-seal assembly according to claim 1, wherein a seal component is present on one or both of the first and second surfaces of the reinforcing component in the outer peripheral border region.

21. A catalysed reinforced membrane seal assembly comprising a catalyst component and a reinforced membrane seal assembly according to claim 1.

22. A reinforced membrane seal electrode assembly comprising a reinforced membrane seal assembly according to claim 1.

23. A fuel cell comprising a reinforced membrane seal assembly according to claim 1.

24. A fuel cell according to claim 23, wherein the fuel cell is a proton exchange membrane fuel cell.

* * * * *